US012775511B2

(12) United States Patent
Zeiler et al.

(10) Patent No.: US 12,775,511 B2
(45) Date of Patent: Oct. 27, 2026

(54) SYSTEMS AND METHODS FOR COMPUTE ORCHESTRATION UTILIZING DISTRIBUTED RUNNERS

(71) Applicant: Clarifai, Inc., Wilmington, DE (US)

(72) Inventors: Matthew D. Zeiler, Fort Lee, NJ (US); David Joshua Eigen, New York, NY (US)

(73) Assignee: NEBIUS BV, Schiphol (NL)

(*) Notice: Subject to any disclaimer, the term of this patent is extended or adjusted under 35 U.S.C. 154(b) by 0 days.

(21) Appl. No.: 18/901,459

(22) Filed: Sep. 30, 2024

(65) Prior Publication Data

US 2026/0093566 A1 Apr. 2, 2026

(51) Int. Cl.
*G06F 9/455* (2018.01)
*G06F 9/54* (2006.01)

(52) U.S. Cl.
CPC ........ *G06F 9/547* (2013.01); *G06F 2209/544* (2013.01)

(58) Field of Classification Search
CPC .......................... G06F 9/547; G06F 2209/544
USPC ........................................................ 719/330
See application file for complete search history.

(56) References Cited

U.S. PATENT DOCUMENTS 8,230,070 B2 7/2012 Buyya et al.
2011/0075549 A1* 3/2011 Lu .......................... H04L 45/22 370/216
2016/0132214 A1* 5/2016 Koushik .................. G06F 8/61 715/741
2023/0266996 A1* 8/2023 Reddy .................. G06F 9/5072 718/105
2023/0418639 A1* 12/2023 Vaishnav ............ G06F 9/45533
2025/0053425 A1* 2/2025 Ryder ................ G06F 9/44505
2025/0123909 A1* 4/2025 Griffin ................ G06F 9/45558
2025/0147950 A1* 5/2025 Hu .......................... G06F 16/27

OTHER PUBLICATIONS

Marco Iorio et al. "Computing Without Borders: The WayTowards Liquid Computing", Jul.-Sep. 2023, Marco hereinafter). (Year: 2023).*

Anderson, David P., Jeff Cobb, Eric Korpela, Matt Lebofsky, and Dan Werthimer. "SETI@home: An Experiment in Public-Resource Computing." Communications of the ACM 45, No. 11 (Nov. 2002): 56-61. https://doi.org/10.1145/581571.581573.

Anderson, David P. "Boinc: A Platform for Volunteer Computing." arXiv, Mar. 5, 2019. http://arxiv.org/abs/1903.01699.

Medel, Víctor, Rafael Tolosana-Calasanz, JoséÁngel Bañares, Unai Arronategui, and Omer F. Rana. "Characterising Resource Management Performance in Kubernetes." Computers & Electrical Engineering 68 (May 2018): 286-97. https://doi.org/10.1016/j.compeleceng.2018.03.041.

Tang, Zhenheng, Yuxin Wang, Xin He, Longteng Zhang, Xinglin Pan, Qiang Wang, Rongfei Zeng, et al. "FusionAI: Decentralized Training and Deploying LLMs with Massive Consumer-Level GPUs." arXiv, Sep. 3, 2023. http://arxiv.org/abs/2309.01172.

(Continued)

*Primary Examiner* — Pierre Vital
*Assistant Examiner* — Abdou K Seye
(74) *Attorney, Agent, or Firm* — BCF LLP

(57) ABSTRACT

Systems, methods and computer program code are provided for processing compute workflows or task requests in a distributed environment.

18 Claims, 5 Drawing Sheets

(56) References Cited

OTHER PUBLICATIONS

Lv, Chengfei, Chaoyue Niu, Renjie Gu, Xiaotang Jiang, Zhaode Wang, Bin Liu, Ziqi Wu, et al. "Walle: An End-to-End, General-Purpose, and Large-Scale Production System for Device-Cloud Collaborative Machine Learning." arXiv, May 29, 2022. http://arxiv.org/abs/2205.14833.

Li, Hongshan, Chenghao Hu, Jingyan Jiang, Zhi Wang, Yonggang Wen, and Wenwu Zhu. "JALAD: Joint Accuracy- and Latency-Aware Deep Structure Decoupling for Edge-Cloud Execution." In 2018 IEEE 24th International Conference on Parallel and Distributed Systems (ICPADS), 671-78, 2018. https://doi.org/10.1109/PADSW.2018.8645013.

* cited by examiner

SYSTEMS AND METHODS FOR COMPUTE ORCHESTRATION UTILIZING DISTRIBUTED RUNNERS

BACKGROUND

Recent advances in artificial intelligence ("AI") have increased demands for running AI compute workflows. A number of frameworks and approaches for running AI compute workflows exist. However, existing approaches require network access to the underlying compute nodes to facilitate communication between a control plane and the compute plane containing nodes that conduct the processing for the workflow.

For example, current approaches to running AI compute workflows commonly use virtual private networks ("VPNs") which provide the ability to connect computers in physically or logically different locations and allow them to communicate securely by providing encrypted traffic between locations. However, VPNs require extensive setup and configuration. VPNs also increase the number of security vulnerabilities because the machines are connected in a way that may circumvent firewalls and other security considerations. A number of software approaches allow volunteers to use their own computers for collaborative scientific research. A system referred to as "BOINC" is a middleware system that allows "volunteer computing" to be used not only for the search for extraterrestrial life but also for many other high-throughput scientific computing. BOINC allows volunteers to install the BOINC software on their own computers. Unfortunately, BOINC (and similar middleware systems) is not suited for dynamic workflows especially when multiple users request different types of work requiring different computer code to operate on the work unit. BOINC is also not suited for returning results to different users based on their queries.

Kubernetes (also referred to as "K8s") addresses several computing problems related to the deployment, scaling and management of containerized applications. Unfortunately, while Kubernetes is good at efficiently allocating compute services to CPUs it does not provide a means for efficient sharing of graphics processing units ("GPUs") resources including multiple GPUs on a single node, multiple processes on a GPU, or a single process using multiple GPUs or sharing GPU memory among processes. While such orchestration systems provide the ability for computing to be supplied for multiple job types and to scale on demand, they do not allow this to be performed across network boundaries or across resource ownership boundaries and do not handle GPU scaling.

It would be desirable to provide improved systems and methods for distributed or grid computing. It would further be desirable to provide such systems and methods while maintaining high levels of security without sacrificing compute performance. It would further be desirable to allow a distributed compute environment leveraging commodity hardware on existing laptops, desktops or mobile devices.

DETAILED DESCRIPTION

Figure 1:
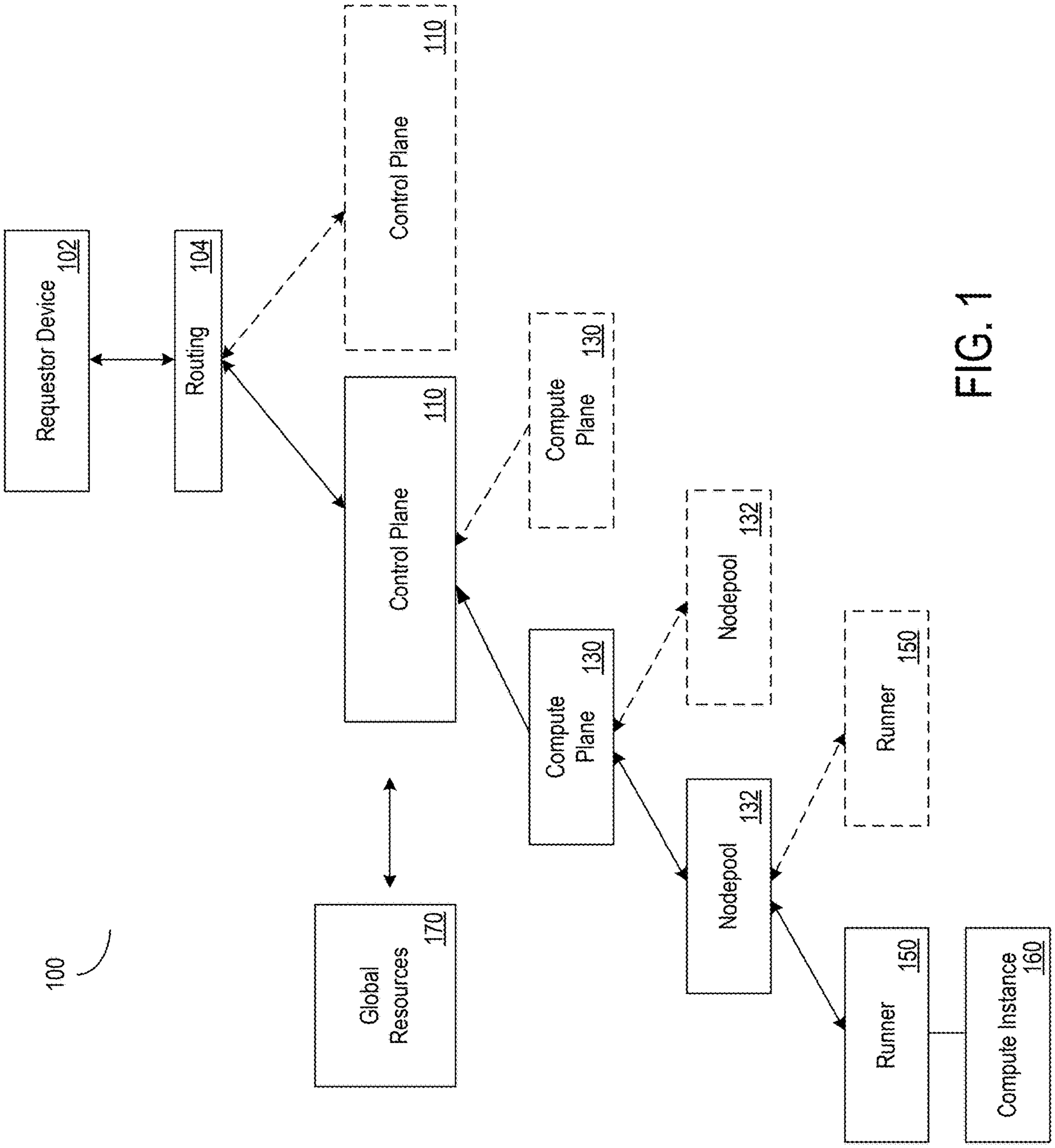
FIG. 1 is a block diagram of a system pursuant to some embodiments.

An enterprise may want to securely initiate and perform compute workflows in a distributed environment. For example, enterprises or other entities are faced with increasing needs to perform AI workflows. Embodiments allow such workflows to be performed in a distributed computing environment while maintaining a high level of security without the need to perform complex network configuration. Embodiments eliminate the need to open communication channels to the compute plane. Further, embodiments allow compute workflows to be performed using commodity hardware (e.g., by using computing resources available on laptops, desktops, mobile devices, reserved instances in cloud environments, etc.).

A technical effect of some embodiments of the invention are improved systems and methods to handle dynamic user requests for machine learning operations with low user complexity, efficient compute operations, low latency responses and a variety of means to provision compute, especially GPU resources, while maintaining a high level of security. With these and other advantages and features that will become hereinafter apparent, a more complete understanding of the nature of the invention can be obtained by referring to the following detailed description and to the drawings appended hereto.

Features of some embodiments will now be described by first referring to FIG. 1 which is a block diagram of a system 100 according to some embodiments of the present invention. As shown, system 100 includes a number of components and interfaces that allow a requestor device 102 to interact with one or more compute instances 160 to execute a workflow (or, as used herein, to submit a "task request"). Each request may involve processing by one or more components of the system 100. The system 100 may include one or more control planes 110, one or more global resources 170 accessible by the control planes 110 and one or more compute planes 130 communicating with each control plane 110.

As will be described further herein, pursuant to some embodiments, communication between a control plane 110 and a compute plane 130 is in one direction—from the compute plane 130 to the control plane 110. That is, in processing a workflow associated with a user request, the components of a compute plane 130 request work or tasks from the control plane. This allows the system 100 to function without requiring complex networking configurations that are required if the control plane 110 were to communicate with each component of the compute plane 130.

Each compute plane 130 may have one or more nodepools 132. A nodepool 132 is a set of dedicated compute instances 160. Each compute instance 160 is associated with a runner 150 that belongs to the nodepool 132 and that is a currently processing container of a model in the nodepool 132. The compute instances 160 may be, for example, a CPU or GPU having a particular configuration (e.g., a GPU running a model or other application). Each compute instance 160 may be physically or logically remote from a control plane 110 with which it interacts. For example, a compute instance 160 may be hosted in a cloud computing environment (such as Amazon Web Services, Google Cloud, or the like), a private network environment, a local instance (e.g., such as a user's laptop or other computer), or the like. Embodiments allow a requestor to make a request (such as a request for an AI related workload) that is routed to a control plane 110 and that is assigned to (and performed by) a compute instance 160 that is capable of handling the request. As will be described further below, in the event that a compute instance 160 is not available to handle the request (e.g., in the event that a particular model or other application is not available), embodiments allow the automated deployment and provisioning of a compute instance 160 (and associated runner 150) to handle the request.

While not shown in FIG. 1, the system 100 may include one or more compute clusters. A "compute cluster" may be used to refer to a cluster of compute instances 160 in a region of a cloud or on-premise. A compute cluster may be associated with a user and/or an organization. For example, one or more nodepools 132 may be part of a compute cluster that a request (from requestor device 102) may be routed to. Pursuant to some embodiments, the system 100 may be operated in a multi-tenant fashion where multiple users may have one or more compute clusters, all within an overall compute plane 130 in which an agent (shown in FIG. 3) is running. The agent may have a multi-tenant mode and a single compute cluster mode (which is used when a user/customer wishes to deploy the agent into their own infrastructure). This allows improved flexibility and convenience, allowing users to run workloads on their own infrastructure or on shared infrastructure. In general, while the compute planes 130 are shown as separate boxes in FIG. 1, each compute plane 130 essentially is made up of one or more compute clusters containing one or more nodepools 132, runners 150 and compute instances 160.

As shown in FIG. 1, a request from a requestor device 102 is transmitted to initiate or receive information associated with one or more compute workflows. In the following, the compute workflows will be described as AI-related compute workflows. However, those skilled in the art, upon reading the following disclosure, will appreciate that embodiments may be used with other types of compute workflows. For simplicity, FIG. 1 (and other figures herein) show one requestor device 102 interacting with one or two control planes 110. In practical application, embodiments will involve many requestor devices 102 interacting with a number of different control planes 110. The requestor device 102 may be operated by a user (e.g., a user interacting with a user interface to submit a request to perform an AI task) or the requestor device 102 may be programmatically controlled (e.g., by a program, bot or other code that causes the creation of a request for processing by the system of the present invention).

The control planes 110 may be, for example, a collection of computing devices that are configured to operate as described herein. For example, as will be shown in more detail in below in FIGS. 2 and 4, each control plane 110 may include an application programming interface ("API"), an orchestrator and one or more databases. Each control plane 110 may receive messages (or requests for work) from one or more compute planes 130. As indicated by the arrows in FIG. 1, each control plane 110 received requests and updates from compute planes 130. Each control plane 110 continuously monitors the messages received from the compute planes 130 to identify which compute instance(s) 160 are available for work and to receive updates from the compute instance(s) 160 (such as to receive the results of workflows performed by the compute instance(s) 160, etc.). Because the compute instance(s) 160 transmit messages to the control planes 110, there is no networking configuration required to enable the control planes 110 to communicate with each compute instance 160.

From the requestor device 102 perspective, the computing infrastructure (including potentially a large number of compute instances 160) appears as a single local device that is able to quickly provide a response to a request transmitted from the requestor device 102. Some or all of the components of FIG. 1 may be hosted by one or more cloud providers, e.g., an Amazon Web Services ("AWS") region or zone (such as AWS West, or AWS East, etc.), or a Google Cloud Platform ("GCP") region or zone, or any similar cloud provider. Some or all of the components of FIG. 1 may be an "on premise" infrastructure. For example, individual compute instances 160 may be local machines (e.g., one or more graphics processing units ("GPUs") may be operated on premise). In some embodiments, compute instances 160 may include GPUs, server devices, laptops, desktop computers, or even mobile devices. Embodiments allow the orchestration of compute workloads across a variety of configurations as will be described further herein.

In some embodiments, a requestor device 102 may interact with compute resources by making requests. In some embodiments, the specific compute instance 160 that handles a request may be determined based on the nature and content of the request. A routing device 104 may route the request (and any responses associated with the request) to one or more control planes 110. In some embodiments, for example, the routing device 104 includes a domain name system ("DNS") router that routes the request based on contents of the request. For example, a request may include a uniform resource locator ("URL") with one or more variables that cause different operations as will be described further herein. In one example embodiment, the routing device 104 may be the Amazon Route 53 DNS service offered by Amazon, Inc. The routing may be based on the request as well as the availability (or non-availability) of a control plane 110. In some embodiments, geographic or location-based routing may be implemented to connect the requestor device 102 to resources physically close to the requestor device 102.

The request may include addressing information, user identification information, application identification information, request content information and request authentication information. In one embodiment, the request is provided as a secure hypertext transfer protocol ("HTTPS"), the user identification information is included in the URL, the authentication information is provided in the header of the HTTPS request, and the request content is provided in the body of the request. As an illustrative but not limiting example, a URL may be formed as: https://api.clarifai.com/users/{user_id}/apps/{app_id} where {user_id} and {app_id} are a string of characters that uniquely identify the user and the application. For example, in some embodiments, the system 100 may allow a user to submit requests associated with a number of different AI related applications, including, for example, a computer vision application, a natural language processing application, a completion application, etc. In some embodiments, the authentication information may include a Personal Access Token ("PAT") or other authentication information. The request content information may vary based on the type of application to be used. For example, a computer vision application may require the input of an image in the request. In such case, the image may be provided (e.g., via a URL or the like) in the request content. As another example, a natural language processing application may require the input of a text prompt in the request content.

The routing device 104, upon receipt of a request from a requestor device 102, routes the request to an appropriate (and available) control plane 110. The control plane 110 to which the request is routed processes the request to identify the user (based on the user_id) associated with the request and consults one or more global resources 170 to identify attributes of the user. For example, a user may be a user that utilizes shared compute instances 160 (such as a shared set of compute nodes managed by the entity that operates the system 100). As another example, a user may be a user that has one or more self-hosted models that run on compute instances 160 operated by or on behalf of the user (e.g., including local machines). As a further example, a user may be a user that has access to a dedicated pool of resources hosted in one or more cloud environments. These user attributes may be identified by the control plane 110 by querying one or more databases of the global resources 170 (for example, by querying the global user database 208 of FIG. 2). Pursuant to some embodiments, any of the control planes 110 of the system 100 may have permissions to query the global user database 208.

The control plane 110 to which the request is routed also processes the request to identify the application (based on the app_id) associated with the request. The application may be a specific compute application to be executed to perform the work associated with the request. For example, the application may be execution of a specific machine learning model, inference, model training, model evaluation, or the like. The identification of the specific application to be executed for a request (as well as the identification of the user) is used by the control plane 110 to determine the required characteristics of a compute instance 160 needed to handle the request. For example, a request involving an inference application that requires a certain type of hardware accelerator (such as an Nvidia A100) will cause the control plane 110 to ensure that the user has access to a compute instance 160 with the appropriate inference model and that also has the required hardware accelerator. As will be discussed further below, the matching of requests to compute instances 160 involves the control plane 110 identifying which compute instances 160 are available to handle the request and that have an appropriate configuration (including the appropriate model, hardware, and other resources) to handle the request. This is achieved by the control plane 110 consulting a database that stores information about each available compute instance 160 (as will be described further below in conjunction with FIGS. 2-4). Once the control plane 110 identifies an available compute instance 160 that is available (e.g., has requested work) and suitable for handling the request, the control plane 110 assigns the request to that compute instance 160 by updating a record in a database.

Pursuant to some embodiments, in situations where no suitable compute instance 160 is available to handle a request (e.g., where no compute instance 160 is configured with the appropriate model or application to handle the request), the control plane 110 may perform operations to automatically cause the deployment of a runner 150 and compute instance 160 configured with the appropriate model or application. Further details of such deployment processing will be provided below.

Once a request has been assigned to a compute instance 160, the compute instance 160 performs processing to handle the request, and transmits one or more responses to the request to the control plane 110 which in turn provides the responses to the requestor device 102. In some embodiments, the response may be a streaming response as will be described further below.

Figure 2:
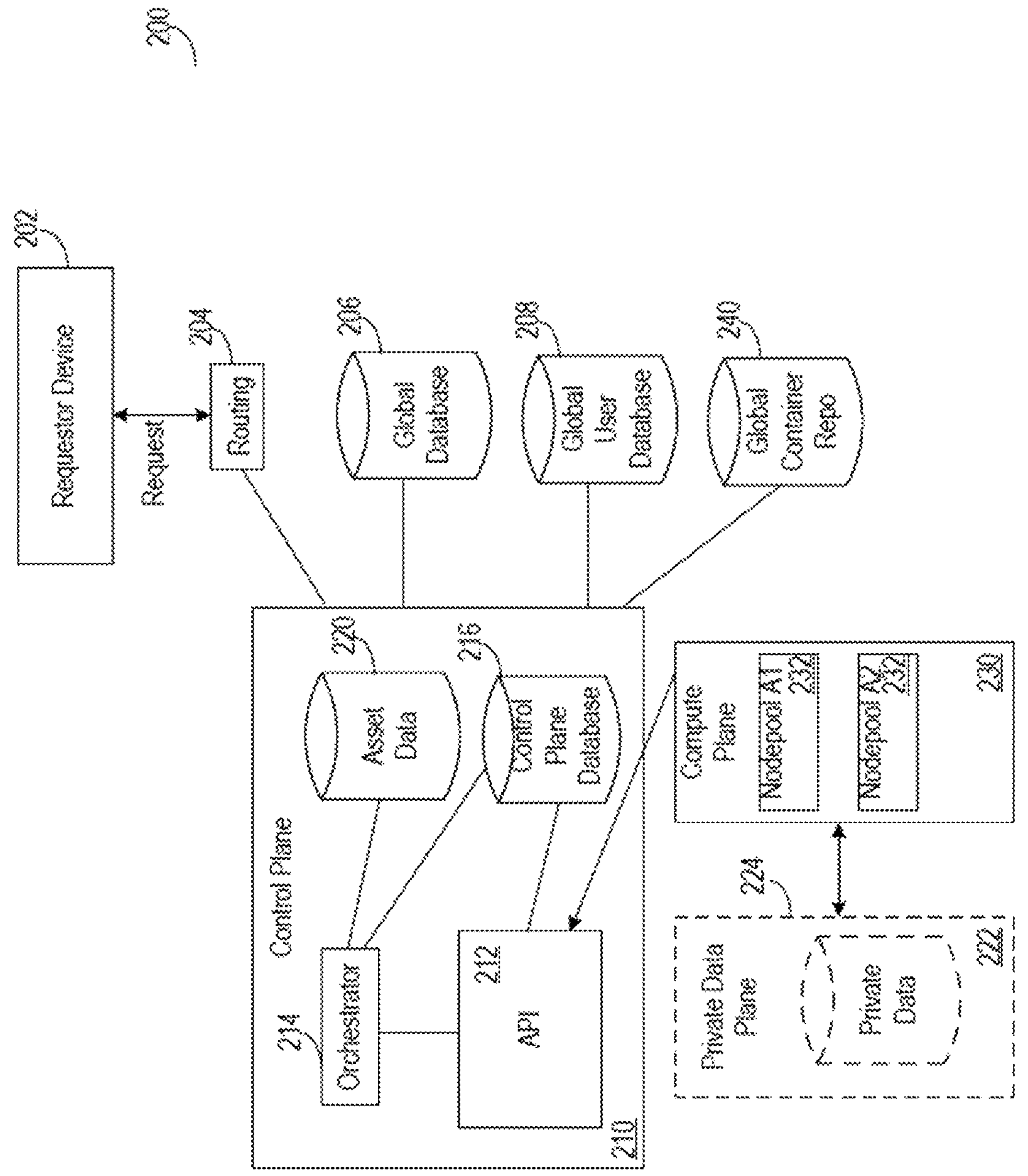
FIG. 2 is a further block diagram of a system pursuant to some embodiments.

Reference is now made to FIG. 2 where further details of a system 200 pursuant to some embodiments are shown. In particular, FIG. 2 depicts certain features of an example control plane 210 and the compute plane 230. In practical application, the system 200 may include additional control planes 210 and compute planes 230, a single one of each is shown for simplicity. As depicted, the control plane 210 includes a number of resources that allow the control plane 210 to receive requests routed from a requestor device 202 via a routing device 204. The control plane 210 may include an application programming interface ("API") 212, an orchestrator 214 and one or more control plane databases 216. In some embodiments, the compute plane 230 and the control plane 210 may be operated in separate geographical or logical regions. As a simple example, a control plane 210 may be located in the United States, while the compute plane 230 may be located in Europe. Further, individual resources associated with the compute plane 230 may be logically separate from other resources of the compute plane 230 (for example, some resources may be on-premise at various locations while other resources may be cloud hosted).

Each control plane 210 may be in communication with one or more global resources such as a global database 206, a global user database 208 and a global container repository 240. When a request is routed to a control plane 210 for handling, the request is presented to the API 212. The API 212 is configured to interpret the request and to extract the user_id, the app_id and the authentication information. The API 212 communicates with the global user database 208 to verify the user information and the application information. In some embodiments, information from the global user database 208 may be cached in the compute infrastructure 200 so that subsequent requests do not require access to the global user database 208. In some embodiments, this information (and other information associated with a request) may be stored in a control plane database 216. In some embodiments, the control plane database 216 (as well as other databases of the system 200 such as database 206) may be implemented using REDIS or other in-memory key value datastores. The use of such datastores allows the orchestrator 214 to subscribe to messages received from the compute plane 230 and to process those messages as will be described further below in conjunction with FIG. 4.

Based on information provided in a request, the API 212 routes the request to the appropriate resources in the compute plane 230. For example, the request may be assigned to different compute instances (not shown in FIG. 2) of the compute plane 230 based on the user_id, the app_id or other information in the request. In some embodiments, once a request is assigned to a compute instance, responses to the request are stored in the control plane database 216 and the result returned to the requestor device 202. This may particularly be beneficial when the request is a repeat of recently received requests.

The compute plane 230 may include one or more nodepools 232. As will be described further below, each nodepool 232 may have one or more processing units (e.g., in the case of AI compute tasks, the processing units are typically GPUs) and runners associated with the processing units. The compute plane 230 requests work or tasks from the control plane 210. Once a compute instance is assigned a request, the compute instance uses the appropriate processing unit(s) with the correct model to compute the response to the request. Further information about the nodepools and processing units will be described further below in conjunction with FIG. 3. In some embodiments, the compute plane 230 may not have a processing unit with the required application installed. In this case, the API 212 may make a request to the global container service 240 to cause the download of one or more containers to run the required application (also referred to herein as a "model"). Once the compute plane 230 is configured with the appropriate processing unit and application, the request may be assigned to that compute instance. Upon completion of the work associated with the request, the compute instance returns a response to the control plane 210 which then returns the response to the requestor device 202.

Embodiments allow compute workflows to be securely implemented and easily configured by reversing the communication protocol such that the compute plane 230 always communicates to the control plane 210. In this manner, embodiments eliminate the need to open up ports within the compute plane 230. In the communication to the control plane 210, the compute plane 230 queries for workloads that require processing. The control plane 210 responds to the query with any available workloads that require processing. Pursuant to some embodiments, a long polling communication protocol is used in which a connection from the compute plane 230 to the control plane 210 is kept open for an extended period of time. If work is available, the control plane 210 will respond to the compute plane 230 with information about the work to be performed. If no work is currently available, the control plane 210 will keep the connection open for a predetermined amount of time. If work becomes available within the predetermined amount of time, the control plane 210 will respond to the compute plane 230 with information about the work to be performed. If the predetermined amount of time expires before work becomes available, the request will time out and the compute plane 230 will immediately make another request, again asking for work.

Once the compute plane 230 has completed work in response to a request, the results are communicated to the control plane 210 to end the workflow processing for that item of work. The compute plane 230 then initiates another request for work and the process described above repeats. As used herein, this repeated process may be referred to as a "long polling loop".

In some embodiments, the long polling loop can establish a bi-directional streaming connection. For example, this streaming connection may be implemented using remote procedure calls ("RPC"), websocket, or the like. This allows the compute plane 230 to initiate the stream by asking for work (as described above). Further, once work is returned from the control plane 210 to the compute plane 230, the bi-directional streaming connection remains open for that item of work. This allows the control plane 210 and the compute plane 230 to communicate without the need to open up ports on the compute plane 230. This substantially reduces the complexity of networking and configuration.

As shown in FIG. 2, the compute plane 230 optionally includes a private data plane 222 storing private data 224. In some embodiments, one or more control planes 210 and compute planes 230 may be operated by or on behalf of an enterprise. In such embodiments, the enterprise may utilize a private data plane to store private data associated with the enterprise. For example, the private data may be stored in an object storage location accessible only to the enterprise. In some embodiments, data that is not private or proprietary to an enterprise may be stored in asset databases 220. For example, the asset database 220 may be an object storage location or other data storage location and may provide storage for object data (such as images, files, etc.) used by the system of the present invention. The asset database 220 may be a multi-tenant database, allowing access by different users and requests, while the private data 224 may be single-tenant, allowing access by only those users and requests that are identified as having access. For example, as shown in FIG. 2, the private data plane 222 includes private data 224 that is not accessible from the control plane 210 but is accessible from the compute plane 230. In some embodiments, this access may be controlled by passing private URLs associated with the private data 224 through the API 212 to the compute plane 230 such that the compute plane 230 has access but the control plane 210 does not have access. This allows a user/customer to control access to read private data 224.

Multiple control planes 210 and compute planes 230 may be provided, allowing requests to be handled by an appropriate (and available) infrastructure. For example, an enterprise using embodiments of the present invention may wish to ensure that any imaging tasks be performed on infrastructure that includes GPUs that are specially configured for image processing tasks. Embodiments allow users of the present invention to efficiently add resources to the system 200 and ensure that appropriate tasks and workloads are processed by those resources. Because the configuration of the present invention substantially eliminates the need for low-level networking and security configurations, resources can easily and efficiently be added to the infrastructure.

Figure 3:
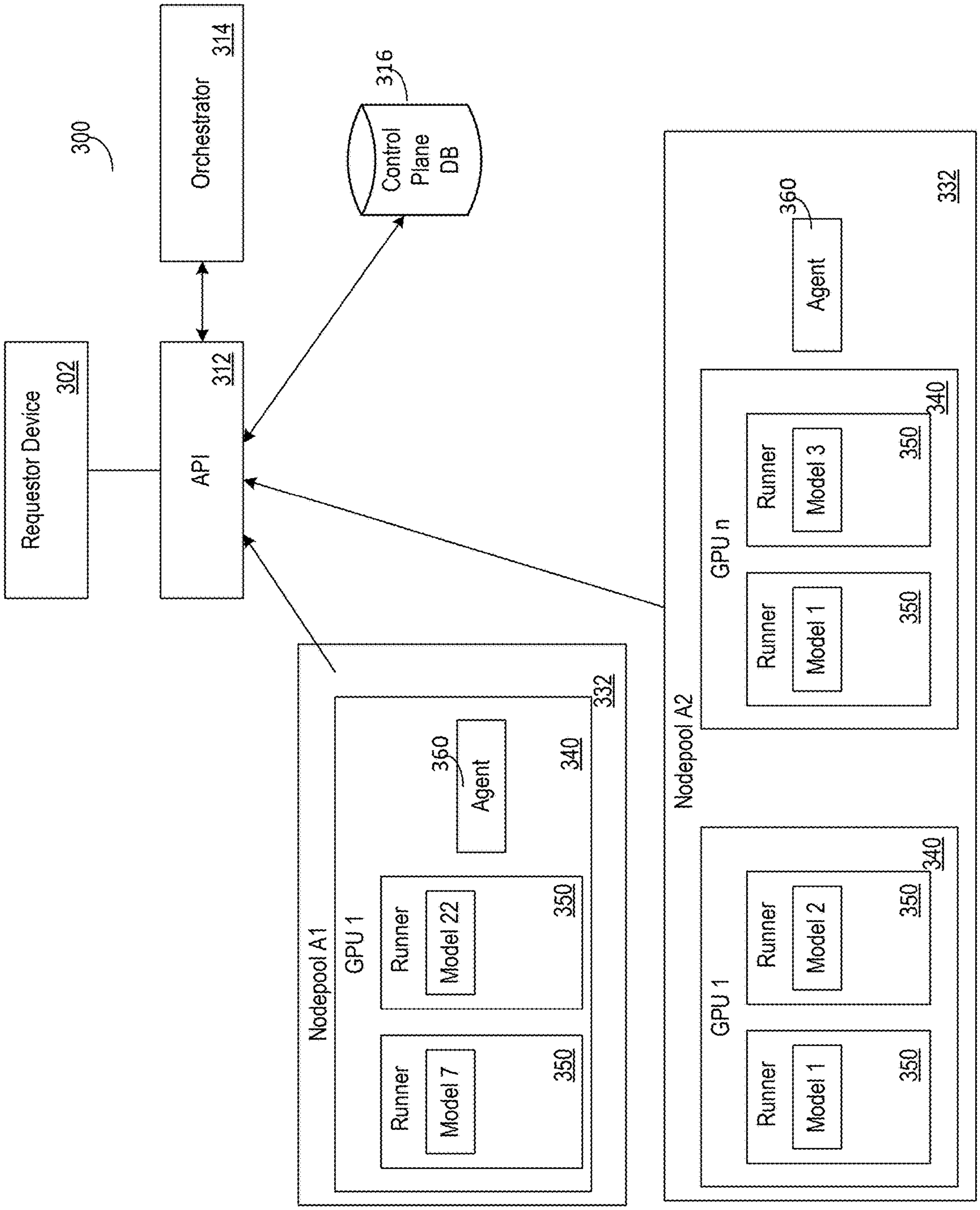
FIG. 3 is a further block diagram of a system pursuant to some embodiments.

Reference is now made to FIG. 3, where a further view of a system 300 pursuant to some embodiments is shown. FIG. 3 depicts a portion of a system 300 focusing on details of the compute plane, including two nodepools 332. A number of terms may be used to describe the system 300 (including components shown in FIGS. 1 and 2). For example, the term "compute cluster" may be used to refer to a cluster of machines in a region of cloud or on-premise. A compute cluster may be associated with a user and/or an organization. For example, the nodepools 332 may be part of a compute cluster that a request (from requestor device 302) may be routed to. The term "nodepool" refers to a set of dedicated compute instances within a cluster. A nodepool belongs to a cluster and can be self-hosted or cloud hosted. The term "runner" or "runner application" may be used to refer to a process that executes computation within a nodepool. For example, a runner may perform model inference, workflow processing, AI training, etc. The term "cluster agent" refers to an agent 360 that is executed within a compute cluster and performs monitoring to detect changes to nodepools, runners and replicas. The term "deployment" refers to the assignment of autoscaling actions to resources to scale in a nodepool 332. The term "autoscaling config" refers to a configuration file associated with a nodepool 332 that is used to configure scaling up and down of replicas within a nodepool 332. The term "computeInfo" refers to the minimum compute resources required for a task or item of work (e.g., the number of cores, memory, accelerators, etc.). The term "instance type" refers to a type of a resource. For example, different types of instances may include on-premise boxes, cloud instances, etc.). The term "image registry proxy" refers to a proxy (not shown in FIG. 3) that is used to authenticate requests to retrieve container images from a container repository (such as the global container repository 240 of FIG. 2).

The components shown in FIG. 3 may be assumed to be the components associated with the infrastructure to which a request from requestor device 302 was routed. As shown in FIG. 3, each nodepool 332 (or more particularly, each runner within the nodepool 332) issues requests to the API 312. As discussed above, these requests are associated with the long polling loop and may be requests for work or responses providing the results of work that has been performed.

As shown in the example embodiment of FIG. 3, a first nodepool 332 has a first GPU 340 with several "runner" applications 350 that execute on the GPU 340. For example, one runner application 350 may be associated with a machine learning model "7" while another runner application 350 may be associated with an AI model "22". These model identifiers are for illustrative purposes only, and the actual model identifiers may be descriptive or alphanumeric identifiers associated with different model versions and types. Each runner application 350 may be implemented in Python or another programming language and is configured to enable communication between the model and the API 312. In some embodiments, each runner application 350 can have multiple replicas, where each replica is a running instance that runs in a long polling loop. In some embodiments, each runner application 350 uses protocol buffers ("Protobuf") as a data serialization format. Each runner application 350 may be defined with a unique identifier (such as a UUID), a string description, a timestamp when the runner was created, a timestamp when the runner was last modified, and information associating the runner with a nodepool 332. In some embodiments, each runner may also be defined with information identifying a particular autoscaling configuration and information identifying the type of requests (or work) that the runner is available for or qualified to handle. Each runner may also be associated with information identifying model resource requirements associated with the runner (and its associated model(s)).

As shown in FIG. 3, a second nodepool 332 has two GPUs 340, each having two runner applications 350 associated with different AI models. Those skilled in the art, upon reading this disclosure, will appreciate that in practical application, a number of nodepools 332 may be provided, each having a number of runner applications 350 and associated models. An orchestrator 314 (associated with a control plane as shown in FIG. 2) monitors the API 312 traffic and determines how many replicas of runners and which runners should be up in which compute plane/nodepool 332. The orchestrator 314 may, in some embodiments, increase the allocation of models to GPUs within the nodepool 332 by accessing the global container store 240 (shown in FIG. 2). The orchestrator 314 may also operate to increase the number of instances available within a nodepool 332 based on explicit instructions or based on a reduced number of requests. Each nodepool 332 may have configuration data associated therewith (again, this configuration data may be specified using Protobuf). For example, each nodepool 332 may include information such as: a unique ID of the nodepool (such as a UUID), the cluster the nodepool is associated with, the minimum number of instances in the nodepool (allowing the nodepool to scale down to this limit), the maximum number of instances in the nodepool (allowing the nodepool to scale up to this limit), etc.

In operation, each of the runners 350 transmits messages to the API 312 asking for work (using the long polling method described above). When the API 312 receives a request from requestor device 302, the API 312 determines which GPU 340 and runner 350 (and model) to transmit the request to (e.g., by determining which GPU 340 and runner 350 can handle the request and are available). The API 312 consults the control plane database 316 to determine which GPU(s) 340 are available and appropriate for a given request (e.g., based on the requests for work received from different devices of the nodepools 332).

Pursuant to some embodiments, the connection between the GPU 340/runner 350 and the API 312 is a bidirectional RPC stream that remains open during the long polling process. This bidirectional RPC stream enables streaming responses to be returned to the API 312 (and from there to the requestor device 302). For example, streaming responses may be desirable for requests that involve LLM text generation tasks (or any kind of streaming requests). The bidirectional RPC stream also enables bidirectional stream workloads. For example, bidirectional stream workloads may be desirable for requests that involve audio or video responses or requests that involve chat completion responses.

While a long polling process has been described, in some embodiments traditional polling on a regular basis may be used. For example, for certain types of workloads that may involve long running tasks (such as AI model training, AI model evaluation, bulk processing workloads, etc.) the compute plane may post status updates to the API 312. Further, while bidirectional stream processing has been described, in some embodiments, rather than bidirectional stream processing, individual requests may be made within the long-polling loop. For example, each runner 350 may make individual requests to ask for work and may make separate requests to post the results of processing the work back to the API 312 of the control plane. While the runners 350 of FIG. 3 are described in conjunction with AI-related examples (and where models are shown associated with each runner 350), the runners 350 may also be associated with other applications. For example, a runner 350 may be associated with applications such as workflows, training jobs, or other applications.

Figure 4:
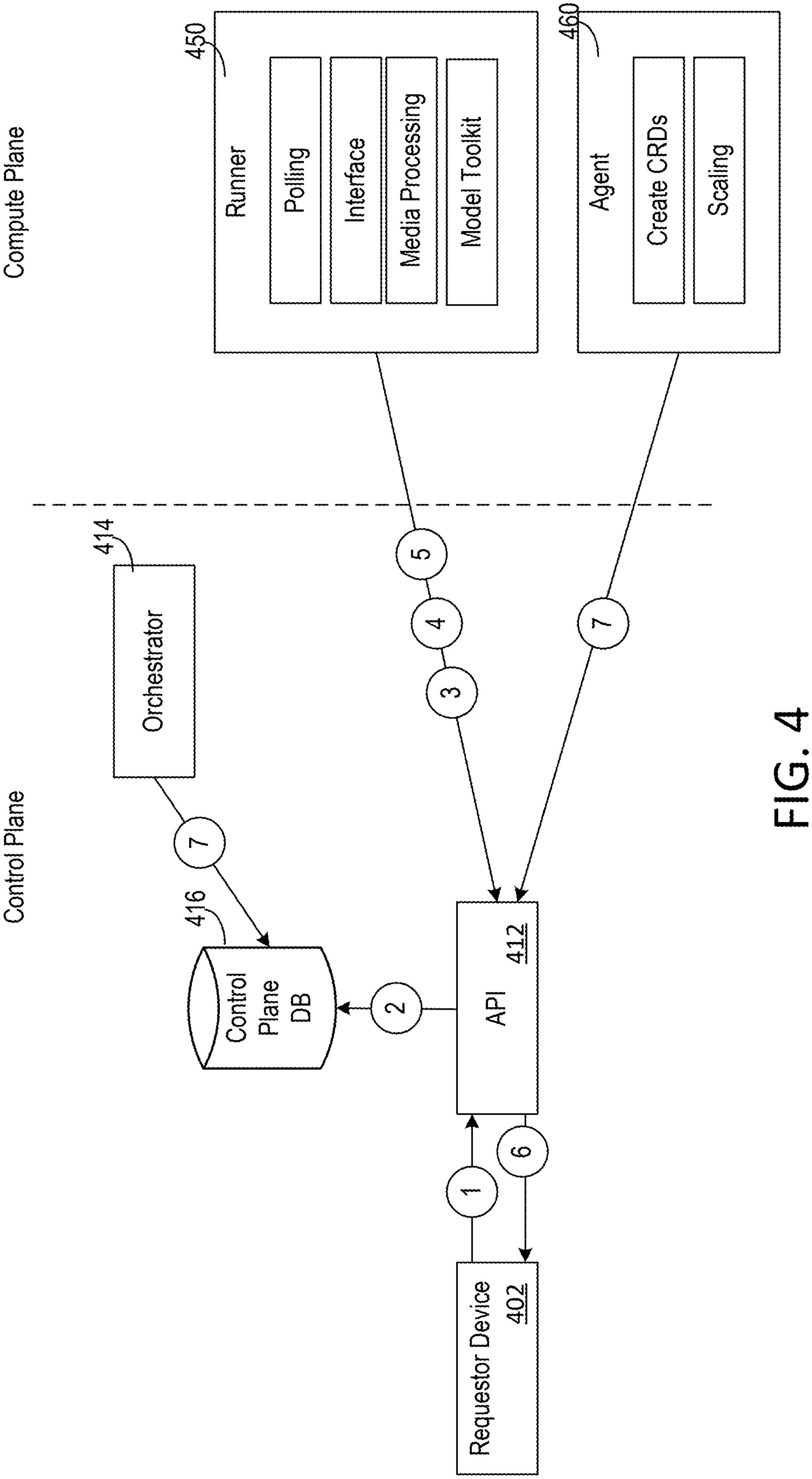
FIG. 4 illustrates a process using a system that may be used pursuant to some embodiments.

Reference is now made to FIG. 4 where an example request flow is shown. The messages between components are shown as numbers (1)-(7). These numbers are used for convenience in describing a process pursuant to some embodiments, and some or all of the messages may be performed outside the numbered sequence or substantially at the same time. A work processing begins at (1) where a requestor device 402 transmits a request message to the API 412. This request message may be routed to a particular compute infrastructure via a router 104 (not shown in FIG. 4 but described in conjunction with FIG. 1). The API 412 makes a call at (2) to the control plane database 416 and adds the work item associated with the request to the database. At (3) (again, not necessarily in sequential order), one or more runners 450 call the API 412 requesting work. This may be part of a bidirectional RPC stream as described above or as an individual request. As described above, each runner 450 has configuration data associated therewith (e.g., as a Protobuf file) that defines which types of work the runner 450 and associated compute instance may handle. The runner 450 may be configured with a number of applications including, for example, a polling application or function (that controls the polling as described herein).

At (4), after the API 412 determines which available and qualified runner 450 to assign the request to, the API 412 provides the request to the selected runner 450 to perform the processing to satisfy the request. The message at (4) may include a unique identifier of the item of work (e.g., as a UUID), a description of the work to be done, and information on how to process the given item. Once the selected runner 450 and associated compute instance perform the requested work a message (5) is returned to the API 412 with the results of the work. The API 412 responds to the requestor device 402 at (6). In the event that the work item is one that requires a bidirectional stream (e.g., in the case of a chat task, or an audio or video task), multiple messages may be transmitted to (and received from) the requestor device 402 and relayed to the runner 450 handling the work.

In the event that a suitable runner 450 and model do not currently exist (or that are available), optional processing at (7) may be performed where an orchestrator is caused to perform processing to deploy an appropriate model. Processing at (7) may also include messages from one or more cluster agents to provide information about the available resources. The orchestrator 414 in the control plane is continuously monitoring all of the traffic that goes through the control plane database 416. The orchestrator 414 monitors to determine whether a runner 450 is not up or available and also to determine when to scale more replicas of runners 450 or to scale down the number of runners 450. If there isn't already a runner 450 up that is suitable to handle a request, the orchestrator 414 will create the runner in the database 416. Separately, the agent 460 of the compute plane is continuously asking the API 412 what should be up in the compute plane. This will alert the agent 460 that a new runner should be up in a nodepool that it is monitoring for and performs processing to deploy the necessary runner. For example, in some embodiments, the agent 460 creates pods in kubernetes and other resources in k8s to deploy the new runner.

Similarly, for scaling the agent 460 will identify how many replicas each runner 450 is supposed to have and keeps that in constant sync with how many are actually up in kubernetes. The agent 460 in the compute plane is used, in some embodiments, to control the underlying resources of the compute plane. In some embodiments, this is controlled using Kubernetes. In this manner, the control plane never needs access to the underlying compute resources in the compute plane. In some embodiments, the agent 460 includes functionality to create custom resource definitions ("CRDs"). When an agent 460 is installed, Kubernetes installs custom resource definitions into the cluster so that the system 400 has well defined types of resources that the agent 460 manages, as well as the relationships between them. Examples of resources include ComputeCluster, nodepool, runner, etc. When a ComputeCluster is deleted it deletes all underlying nodepools which deletes their underlying runners and the runners delete their underlying deployments of pods. This ensures that deployment and management of resources is efficient.

The devices of system 100 (including, for example, the requestor devices 102, etc.) may communicate using any communication platforms and technologies suitable for transporting data and/or communication signals, including any known communication technologies, devices, media, and protocols supportive of data communications. For example, the devices of system 100 may exchange information via any wired or wireless communication network such as the Internet, an intranet, or an extranet. Note that any devices described herein may communicate via one or more such communication networks.

Figure 5:
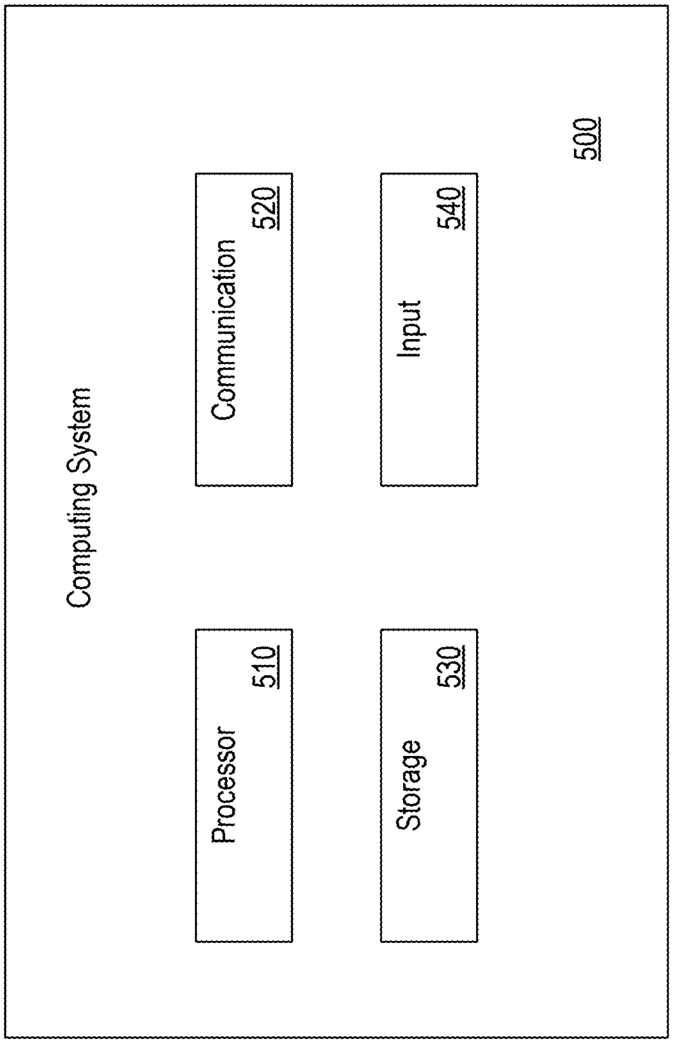
FIG. 5 illustrates a device that may be used in some embodiments.

The embodiments described herein may be implemented using any number of different hardware configurations. For example, FIG. 5 illustrates a requestor device 500 that may be, for example, associated with the system 100 of FIG. 1 as well as the other systems and components described herein. The requestor device 500 comprises a processor 510, such as one or more commercially available central processing units (CPUs) in the form of microprocessors, coupled to a communication device 520 configured to communicate via a communication network (not shown in FIG. 5). The communication device 520 may be used to communicate, for example, with one or more control planes. The requestor device 500 further includes an input device 540 (e.g., a mouse and/or keyboard to enter information associated with a request) and an output device (e.g., a computer monitor to display results to a user).

The processor 510 also communicates with a storage device 530. The storage device 530 may comprise any appropriate information storage device, including combinations of magnetic storage devices (e.g., a hard disk drive), optical storage devices, mobile telephones, and/or semiconductor memory devices. The storage device 530 may store one or more programs for controlling the processor 510. The processor 510 performs instructions of the programs and thereby operates in accordance with any of the embodiments described herein.

The programs may be stored in a compressed, uncompiled and/or encrypted format. The programs may furthermore include other program elements, such as an operating system, a database management system, and/or device drivers used by the processor 510 to interface with peripheral devices.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A computer implemented method to respond to a task request, the method comprising:

receiving, at a control plane, a task request message, the task request message including information identifying a task to be performed, information identifying an application, and information identifying a requestor, the control plane in communication with a plurality of applications of a compute plane wherein all communication between the control plane and the compute plane is initiated exclusively from the compute plane to the control plane such that no inbound network connections to the compute plane are required;

receiving, by the control plane, a plurality of requests for work messages, each request for work message received from a runner application associated with a processor of compute plane over one of (i) a bidirectional streaming connection and (ii) a long polling communication protocol connection;

determining, by the control plane, a selected one of the plurality of requests for work messages that is compatible with the task request message;

transmitting, by the control plane, the task request message to the runner application associated with the selected one of the plurality of requests for work messages;

receiving, from the runner application associated with the selected one of the plurality of requests for work messages, a response to the task request message; and transmitting the response to the task request message to the requestor.

2. The method of claim 1, wherein the long polling communication protocol connection is an HTTPS connection.

3. The method of claim 1, wherein the long polling communication protocol connection is a long polling loop that is completed upon receiving the response to the task request message.

4. The method of claim 1, further comprising:

determining, by the control plane, that none of the plurality of requests for work messages is compatible with the task request message;

causing installation of application software compatible with the information identifying the application in the task request message and associating the application software with a first runner; and receiving a first request for work message from the first runner, wherein the selected one of the plurality of requests for work messages is the first request for work message.

5. The method of claim 1, wherein the compute plane includes a plurality of processors, each processor associated with a respective runner.

6. The method of claim 4, wherein the compute plane is at least one of (i) geographically, and (ii) logically separate from the control plane.

7. The method of claim 5, wherein at least one of the plurality of processors is located on premise, and at least a second one of the plurality of processors is cloud hosted.

8. The method of claim 5, wherein the control plane is hosted in a first cloud environment and the compute plane is hosted in a second cloud environment.

9. The method of claim 1, wherein the bidirectional streaming connection is at least one of (i) an RPC connection, and (ii) a socket connection.

10. The method of claim 1, further comprising a second control plane, the method further comprising:

routing the task request message to the control plane, wherein the routing is based on information contained in the task request message.

11. The method of claim 1, wherein determining a selected one of the plurality of requests for work messages that is compatible with the task request message is based at least in part on: (i) the information identifying the requestor and (ii) the information identifying an application.

12. A system, comprising:

a processing unit; and a memory storage device including program code that when executed by the processing unit causes the system to:

receive, at a control plane, a task request message, the task request message including information identifying a task to be performed, information identifying an application, and information identifying a requestor, the control plane in communication with a plurality of applications of a compute plane, wherein all communication between the control plane and the compute plane is initiated exclusively from the compute plane to the control plane such that no inbound network connections to the compute plane are required;

receive, by the control plane, a plurality of requests for work messages, each request for work message received from a runner application associated with a processor of a compute plane over one of (i) a bidirectional streaming connection and (ii) a long polling communication protocol connection;

determine, by the control plane, a selected one of the plurality of requests for work messages that is compatible with the task request message;

transmit, by the control plane, the task request message to the runner application associated with the selected one of the plurality of requests for work messages;

receive, from the runner application associated with the selected one of the plurality of requests for work messages, a response to the task request message; and transmit the response to the task request message to the requestor.

13. The system of claim 12, wherein the long polling communication protocol connection is an HTTPS connection.

14. The system of claim 12, wherein the long polling communication protocol connection is a long polling loop that is completed upon receiving the response to the task request message.

15. The system of claim 12, wherein the memory storage device further includes program code that when executed by the processing unit causes the system to:

determine, by the control plane, that none of the plurality of requests for work messages is compatible with the task request message;

cause installation of application software compatible with the information identifying the application in the task request message and associating the application software with a first runner; and receive a first request for work message from the first runner, wherein the selected one of the plurality of requests for work messages is the first request for work message.

16. The system of claim 12, further comprising a second control plane, the memory storage device further including program code that when executed by the processing unit causes the system to:

route the task request message to the control plane, wherein the routing is based on information contained in the task request message.

17. The system of claim 12, wherein determining a selected one of the plurality of requests for work messages that is compatible with the task request message is based at least in part on: (i) information identifying a user associated with the task request message and (ii) information identifying an application associated with the task request message.

18. A non-transitory, machine-readable medium comprising instructions thereon that, when executed by a processor, cause the processor to execute operations to perform a method, the method comprising:

receiving, at a control plane, a task request message, the task request message including information identifying a task to be performed, information identifying an application, and information identifying a requestor, the control plane in communication with a plurality of applications of a compute plane wherein all communication between the control plane and the compute plane is initiated exclusively from the compute plane to the control plane such that no inbound network connections to the compute plane are required;

receiving, by the control plane, a plurality of requests for work messages, each request for work message received from a runner application associated with a processor of a compute plane over one of (i) a bidirectional streaming connection and (ii) a long polling communication protocol connection;

determining, by the control plane, a selected one of the plurality of requests for work messages that is compatible with the task request message;

transmitting, by the control plane, the task request message to the runner application associated with the selected one of the plurality of requests for work messages;

receiving, from the runner application associated with the selected one of the plurality of requests for work messages, a response to the task request message; and transmitting the response to the task request message to the requestor.

* * * * *